C. H. PASCH.
WELDING TORCH.
APPLICATION FILED MAY 3, 1920.
1,430,026.
Patented Sept. 26, 1922.
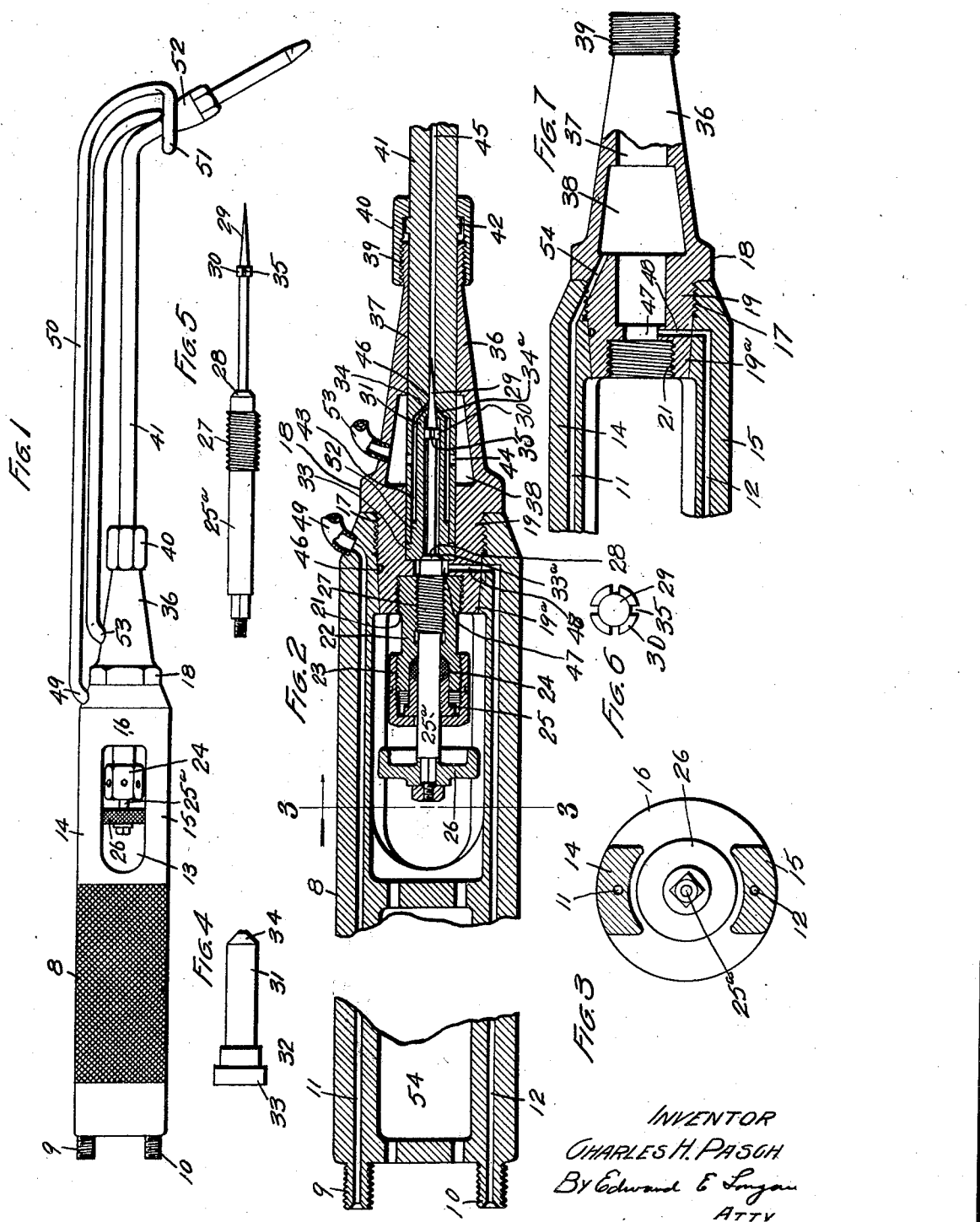
INVENTOR
CHARLES H. PASCH
By Edward E. Longan
ATTY Patented Sept. 26, 1922.

1,430,026

UNITED STATES PATENT OFFICE.

CHARLES H. PASCH, OF ST. LOUIS, MISSOURI.

WELDING TORCH.

Application filed May 3, 1920. Serial No. 378,576.

*To all whom it may concern:*

Be it known that I, CHARLES H. PASCH, a citizen of the United States, and resident of St. Louis and State of Missouri, have invented certain new and useful Improvements in Welding Torches, of which the following is a specification containing a full, clear, and exact description, reference being had to accompanying drawings, forming a part thereof.

My invention relates to welding torches and has for its primary object a welding torch in which only one valve is necessary to control the flow of the two gases. A further object is to provide a single valve torch with an additional pipe which is looped near the tip, this pipe acting as a preheater and expander for the facilitating combustion. A still further object is to construct a welding torch in which the acetylene gas can be used at generator pressure.

In the drawings:—

Fig. 1 is a side elevation of my device.

Fig. 2 is an enlarged longitudinal section.

Fig. 3 is a cross-section taken on the line 3—3 of Fig. 2 and viewed in the direction indicated by the arrow.

Fig. 4 is a side elevation of the acetylene nozzle.

Fig. 5 is a side elevation of the valve stem.

Fig. 6 is an enlarged end view of the valve stem, viewing the same from the front.

Fig. 7 is a fragmental longitudinal section showing the construction with the expander pipe omitted.

In the construction of my device 8 represents the handle formed integral with one end of the handle or the screw-threaded projections 9 and 10, these being for the purpose of attaching the hoses which carry the gas. Within the handle 8 I form the oxygen passage 11 and the acetylene passage 12. Near the front of the handle a portion of the walls are cut away leaving the opening 13 and the connecting ribs 14 and 15, which connect the front end 16, this end being again solid. The front end of the torch is tapered and is provided with internal screw-threads 17, which receive the threads formed on the nut 18. These threads are formed on the projection 19 and extend only for a portion of its length and the balance being tapered as at 19ª. The projection 19 is provided with screw-threads 21, which receive the threaded end of the cylindrical member 22. The opposite end of the member 22 is also screw-threaded as indicated by numeral 23. This screw-threaded portion is provided with a counter bore which acts as a stuffing box and receives the gland 25. This gland is secured within the stuffing box by means of the nut 24. Located within the cylindrical member and stuffing box is the valve stem 25ª which is provided on its projecting end with a knurled thumb wheel 26. A portion of the valve stem 25ª is provided with screw-threads 27 which are designed to be received within the cylindrical member 22. At a short distance from the threaded portion 27 the valve stem is provided with an inclined face 28. The purpose of this face will be explained later. The front end of the valve stem is provided with a needle point 29 and the collar 30, this collar acting as a guide for the front of the valve stem. The front part of the valve stem is then inserted in the nozzle 31. This nozzle is provided on one end with the enlargement 32 and the projecting flange 33, the opposite end being tapered as indicated by the numeral 34ª. The nozzle 31 is provided with a central opening 32, this opening being enlarged and tapered as at 33ª and reduced and tapered as at 34ª, these tapers acting as a double valve seat. The taper 33ª has a seat for the tapered face 28 and the tapered portion 34ª has a seat for portion of the needle point 29. The collar 30 is provided with a plurality of openings 35, these openings permitting the passage of the acetylene gas. Formed integral with the nut 18 and projecting therefrom is the tapered portion 36, this tapered portion being provided with a cylindrical opening 37, a portion of which is enlarged so as to form an oxygen reservoir 38, and the front of the tapered portion 36 is provided with screw-threads 39 which receive the nut 40. This nut is passed over the tubular member 41 and secures it within the portion 36 by means of the flange 42 which is formed integral with the tubular member 41. This construction will be readily seen in Fig. 2. A portion of the tubular member 41 is counter-bored as at 43 and receives the nozzle 31 and the enlargement of collar 32 while the flange 33 rests against the end of the tubular member 41. This tubular member is further provided with openings 44, which openings are so positioned as to form passageways from the oxygen chamber 38 into the counter-bore 43. The tubular member 41 is further provided with the central opening 45, this opening being provided with an inclined face 46, which acts as a valve seat for the needle point 29. The projection 19 is provided with a circumferential groove 46, which groove is designed to register with the acetylene passage 12. When the nut 18 is seated and connected this groove with the opening 47 formed in the projection 19 is the passageway 48. Connected to the oxygen passage 11 is the end 49 of the expanding tube 50. This expanding tube is brought forward, thence bent downward into the loop 51 and after encircling the tip socket 52 on the tubular member 41 has its end 53 secured within the oxygen reservoir 38. The purpose of this is to utilize the heat when making a weld to expand the oxygen gas and thus increase its volume and reduce the amount of oxygen used. When it is desired to eliminate the expanding pipe or tube 50 the passage 11 is directly connected to the oxygen chamber 38 by means of the passage 54.

By the use of my device it is possible to use the acetylene at generator pressure as the oxygen passing over the nozzle and into the pipe or tubular member 41 will act in the same manner that a steam charge does in an injector, i. e., formed a vacuum in the nozzle 31 and draw the acetylene gas through and into the passage 45.

As will be seen in Fig. 3, the thumb wheel 26 is at all times protected so that in event the torch falling to the floor the valve stem will not be bent and rendered useless.

Another feature of my device is that the entire valve mechanism can be readily removed by merely unscrewing the nut 18. I may also, if found desirable, place the valve mechanism underneath the handle or secure it in the tip socket without departing in any way from the spirit of my invention or impairing its utility. Another feature of my device is the ease with which the flame can be regulated without removing the torch or the eyes from the work. This is a considerable saving in time as where the valves are two in number as in torches of the present construction and located at the rear of the handle it is second nature to take the tool away from the work while regulating these valves. This allows the work to cool and considerable time is wasted in reheating the same. By being able to use gas at generator pressure it is possible to do away with the acetylene bottle entirely, but still if found more convenient my device will operate equally well with the acetylene bottle.

I may also if desired close the chamber 54 which is formed in the rear end of the handle and utilize it as an acetylene reservoir. This would be accomplished by having the acetylene passage 12 opening into the front end of the chamber 53, and the passage formed through the threaded projection 10 opened directly into the rear end of the chamber.

Having fully described my invention, what I claim is:

1. A welding torch comprising a handle having a pair of passages formed therein, a tapered portion secured to the forward end of said handle, a nozzle secured in said tapered portion, a passage way formed in said tapered portion, said passage way communicating with one of the first mentioned passages and with the interior of the nozzle, a valve stem secured in said nozzle for regulating the passage of gas therethrough, a chamber formed in the tapered portion and surrounding the nozzle, a tip pipe spaced apart from and surrounding the forward portion of the nozzle, a tip secured by said tip pipe, a passage for connecting the remaining passage in the handle, and the chamber in the tapered portion, passages formed through the tip pipe for permitting the gas from the chamber to enter and surround the nozzle, and a thumb wheel for operating said valve stem.

2. A welding torch comprising a handle having a pair of passages formed therein, a tapered portion secured to the forward end of said handle, a nozzle secured in said tapered portion, a passage way formed in said tapered portion, said passage way communicating with one of the first mentioned passages and with the interior of the nozzle, a valve stem secured in said nozzle for regulating the passage of gas therethrough, a chamber formed in the tapered portion and surrounding said nozzle, a tip pipe secured to the tapered portion, said tip pipe being spaced apart from and surrounding the forward portion of the nozzle, a tip secured to said tip pipe, a pipe secured to the remaining passage in the handle and extending forward, surrounding the tip and then extending backward into the chamber formed in the tapered portion, passages formed through the tip pipe for permitting gas from the chamber to enter and surround the nozzle, and means for operating said valve stem to regulate the flow of gas through the nozzle and tip pipe simultaneously.

In testimony whereof, I have signed my name to this specification.

CHARLES H. PASCH.